No. 871,295. PATENTED NOV. 19, 1907.
W. L. ROSE.
COTTON CHOPPER.
APPLICATION FILED NOV. 16, 1905.
3 SHEETS—SHEET 3.
FIG. 3.
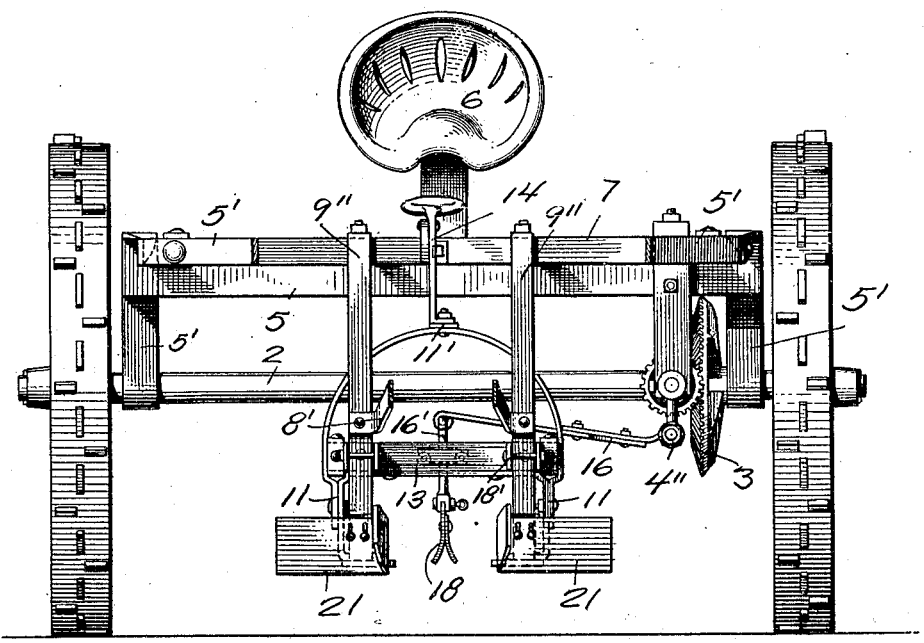
FIG. 6.
FIG. 7.
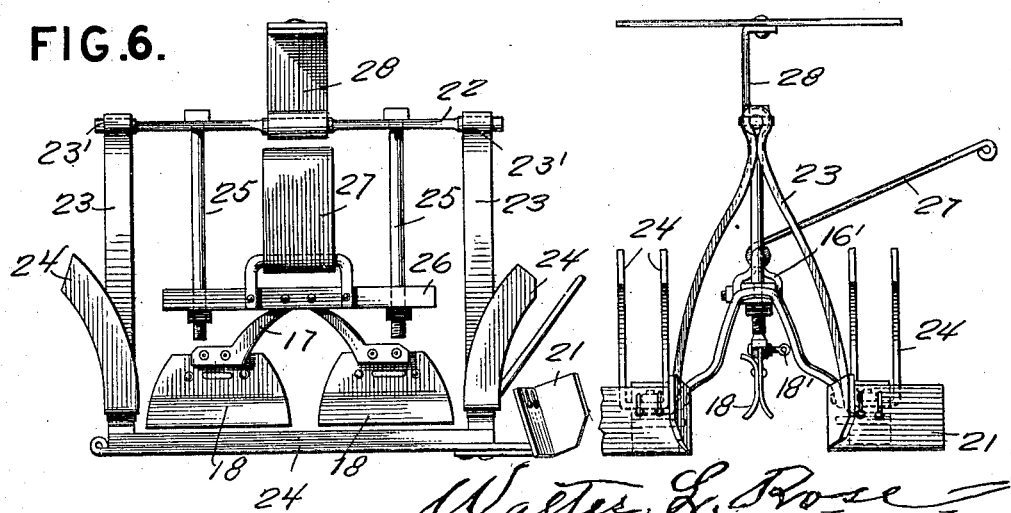
Witnesses:
James F. Rose
Thomas Philip Coraway
Walter L. Rose
Inventor

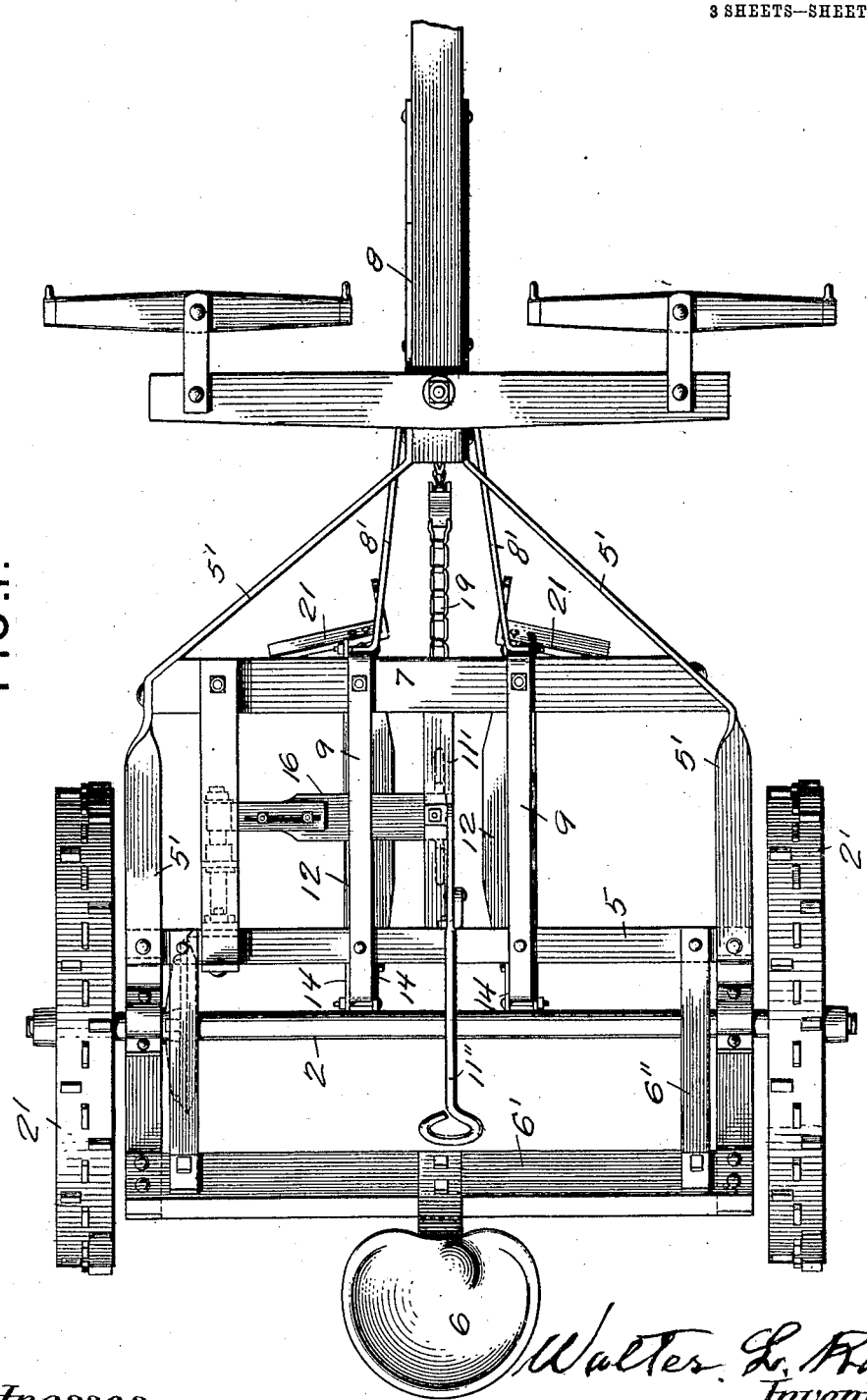

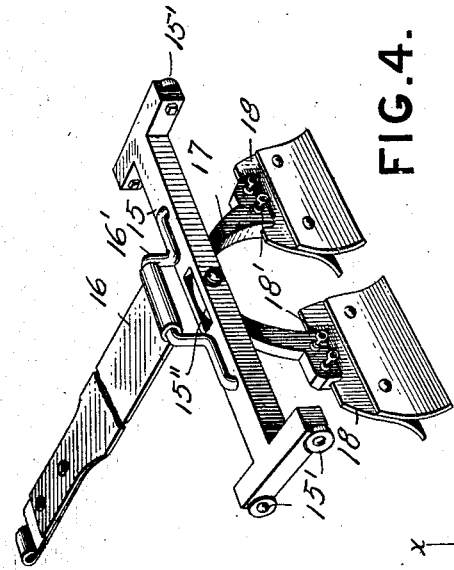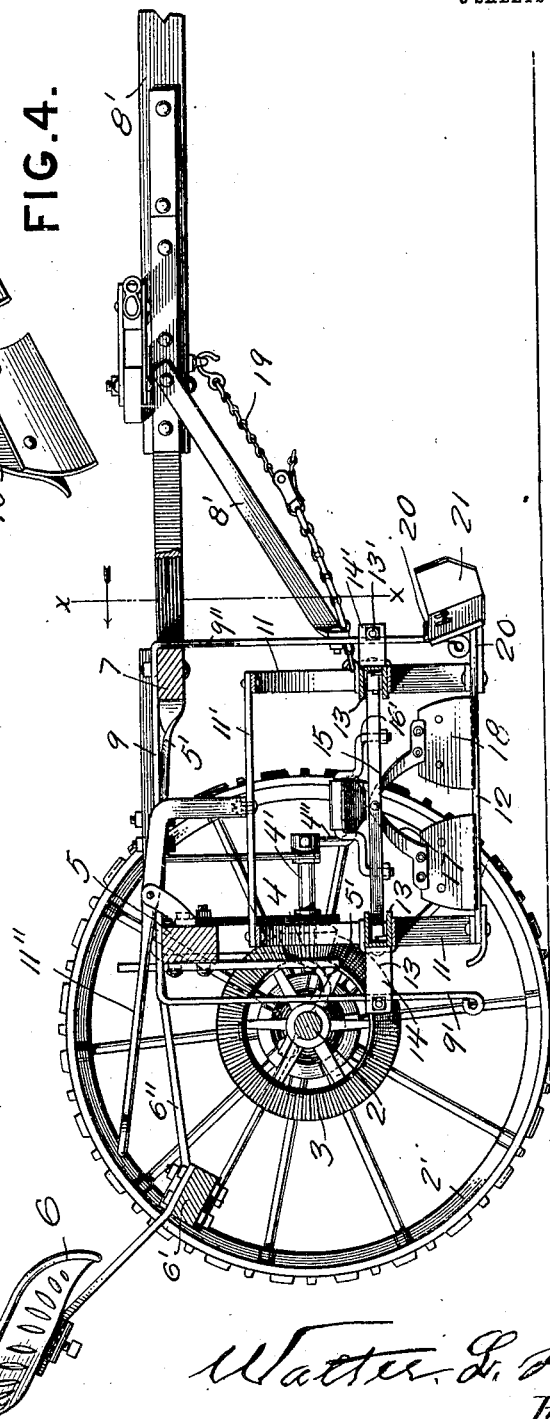

UNITED STATES PATENT OFFICE.

WALTER LEAK ROSE, OF WADESBORO, NORTH CAROLINA.

COTTON-CHOPPER.

No. 871,295.      Specification of Letters Patent.      Patented Nov. 19, 1907.

Application filed November 16, 1905. Serial No. 287,600½.

*To all whom it may concern:*

Be it known that I, WALTER LEAK ROSE, a citizen of the United States, residing at Wadesboro, in the county of Anson, in the State of North Carolina, have invented new and useful Improvements in Cotton-Chopping Machines, of which the following is a specification.

My invention relates to machines for cultivating cotton and more particularly for "chopping" cotton; that is, for thinning out the row of young plants to a greater or less "stand".

The objects of my invention are to provide a machine which shall be capable either of chopping with a circular motion, back and forth across the row, or back and forth horizontally across the row; one wherein the chopping hoes may be adjustable towards each other to leave a greater or less number of plants in each stand; to provide means whereby the hoes or choppers will always keep a certain distance from the ground and follow the inequalities of the row; and to provide adjustable scrapers on either side of the machine for clearing the ground on either side of a row.

To these ends my invention consists in the instrumentalities and arrangement of parts set forth in the accompanying specification and more specifically stated in the claims appended.

I have illustrated an embodiment of my invention in the accompanying drawings, wherein Figure 1 is a plan view of the machine. Fig. 2 is a side view partly sectional, the near wheel being removed. Fig. 3 is a front elevation, partly sectional, on line x—x, Fig. 2. Fig. 4 is a detail of the slide to which the choppers are attached. Fig. 5 is a detail perspective of a runner. Fig. 6 is a front view of the swinging-chopper frame detached from the apparatus. Fig. 7 is a side elevation of Fig. 6.

Like reference characters throughout the several views refer to like parts.

2 designates a supporting axle provided with the wheels 2', one of these wheels being preferably loose on said axle, and the other keyed thereto.

Supported on and above the axle is the rear cross bar 5 of the machine frame, and the usual seat 6 for the driver. These may be supported on the axle in any suitable or desired manner. I have shown the bar 5 as supported on the braces 5' 5', which at the ends are bolted to the bar 5 and then extend downward until a little below the axle; are then bent upward and partly around the axle, and then upward and rearward to a cross piece 6', to which they are bolted. The cross piece 6' is connected to the transverse bar 5 by straps 6", and to the cross piece 6' is bolted the supporting bar of the seat 6 in the manner usual to agricultural machines. The braces 5' before referred to extend forwardly to the front brace 7 of the machine to which they are bolted and are then bent inwardly in approximate V-shape and bolted to the tongue 8, as shown clearly in Fig. 1. This forms the supporting frame of my apparatus.

9 9 are two supporting straps each in the form of a reversed U which pass over the front and rear transverse bars 5 and 7, to which they are bolted and extend down as at 9' 9" to a short distance from the ground. The forward turned down portions 9" of these bars are braced by braces 8' extending downward from the tongue.

The hoes or cotton choppers are supported in a vertically movable frame which has a sliding engagement with the depending supports 9' 9". This frame comprises two end pieces 11, 11 preferably made of metal and of an arch shape. A longitudinal bar 11' connects the end pieces at their apex and at their lower ends the legs of one end piece are connected to the corresponding legs of the other end piece by iron runners 12 of the form shown in Fig. 5, having turned-up ends, whereby they may glide easily over the ground on either side of the cotton row.

Transversely between the legs of each of the end pieces is a guide 13 made of a bar of channel iron the open side being toward the middle of the frame. On the closed side of each of these bars at each end of the same are two lugs 14 which, as shown clearly in Figs. 2 and 3, project on either edge of each of the dedepending supporting bars 9' 9". A bolt 13' connects each pair of lugs outside of the bar 9' or 9". This construction provides for the hoe-carrying frame being vertically shiftable on the depending supports 9' 9".

A hand lever 11" is pivoted on a bracket attached to the transverse bar 5 and is connected to the cross piece 11' but it will be obvious that I may connect the lever in any other manner to the frame.

The channeled guide bars 13 have their open side directed towards each other as before stated, and thus form transverse guides for the reception of the ends of a horizontally reciprocating hoe-support 15 shown in detail in Fig. 4. Preferably this bar is I-shaped and at its ends carries rollers or wheels 15' which run in the guides formed by bars 13.

Pivotally connected to the hoe-support is a link 16 which at its further end connects with a crank 4" on shaft 4'. I deem it preferable that this link should be made in two parts, as shown clearly in Fig. 3, overlapping at their meeting ends and held together by bolts passing through slots. By this means the link may be readily shortened or lengthened. I have shown the link connected pivotally at its free end to an elongated staple 16', the ends of which are bent at right angles and then downwardly passing through the bar 15 and having screw threaded ends provided with nuts.

Projecting downwardly from the sliding supporting bar 15 is the hoe shank 17. This as I have shown it is double, and semicircular in form, bolted at its center in a recess 15" formed in the middle of bar 15. The two depending ends of the shank are broadened and longitudinally slotted to receive the upper edges of the hoes 18. Set screws 18' on the shanks hold the hoes rigidly set in position. By loosening the set screws, the hoe blades may be shifted in the shank and set nearer to or further apart from each other to suit the "stand" desired.

The hoes 18, while they might consist of one blade each, I prefer to make with two somewhat concave blades set back to back and riveted together as shown clearly in Figs. 3, 4, and 7, one of these blades extending upward beyond the other to form the back of the combined blades, engaging the slot in the shank.

A chain 19 having means whereby it may be tightened is connected at one end to the tongue 8 and at its other to the middle of the transverse bar 13, thus resisting rearward strain on the vertical movable frame carrying the hoes.

Attached to the forward end of each runner 12 is an angularly bent iron 20.

21 designates scrapers or cleaning blades, each formed with a main portion, adjustably bolted to the upturned end of the iron 20, the blade being provided with vertical slots for this purpose; the blades at their inner ends are angularly bent to project forwardly. Preferably the scrapers are set on an incline to the vertical. These scrapers work on either side of the row of cotton plants to clean between the rows.

As will be seen, the hoe carrying frame is supported on the runners 12 and is free to move up or down independent of the vehicle itself within certain limits, the frame sliding on and being guided vertically by the rods 9' 9".

In operation the movement of the vehicle gives rotation to the crank shaft 4' and the crank 4", through the link 16, oscillates the heavy hoe-carrying bar 15 along the tracks or guides 13, thus forcing the hoe blades back and forth across the cotton row, the plants being left standing between the hoe blades,—the length of the blades and the diameter of the bevel gear 4 being so proportioned to the diameter of bevel gear 3 that the rearmost hoe will always scrape in the path made by the foremost hoe on the stroke before.

In Figs. 6 and 7 I show a modification of the construction heretofore described, which consists in mounting the hoes upon a partly rotatable shaft or pivot, so that the hoes not only have a movement transverse to the row, but they move in the arc of a circle of which the said shaft is a center. In this construction, 22 designates the shaft which is supported on end bearings 23' which are formed in the apex of the arch-shaped end pieces 23, corresponding to the end pieces 11 of the form of machine shown in Fig. 2. The lower ends of the end pieces 23 are attached to runners 24 corresponding to the runners 12 heretofore described. The forward end of each of these runners is provided with a plow or scraper 21 as shown in Fig. 2, heretofore described.

Inasmuch as the end pieces 23 are not parallel with the depending supports 9" the construction shown in Fig. 2 cannot be used for attaching and guiding the end pieces on the supports 9". Hence I have provided the upwardly and outwardly curved lugs 24 arranged in pairs, a pair at each end of each runner. These engage with downwardly projecting supports 9" (shown in Fig. 2) and allow the end pieces 23 of the hoe supporting frame to be guided up and down on the supports 9".

The bearings 23' allow the shaft 22 to be rotated therein. Depending from the shaft are the bolts 25 which carry at their lower ends the heavy cross piece 26 designed to give weight to the hoes. This cross piece is of the same construction as the cross piece 15, in Fig. 2, and the hoes are attached thereto in the same manner.

A link 27 connects the cross piece 26 to the crank 4" in exactly the same manner as heretofore described with regard to the link 16. A link 28 connects the shaft 22 to any suitable raising lever such as 14, described heretofore.

Having described my invention what I claim is:

1. In a cotton chopper, a wheeled supporting frame, downwardly depending guide supports on said frame, slideways extending transversely across the frame and supported on the said downwardly depending supports, a heavy laterally reciprocating beam mounted to bear on its ends upon the said slideway, a cotton chopping hoe depending from said beam, and mechanism for reciprocating said beam and its hoe as the supporting frame is moved along the row.

2. In a cotton chopper, a wheeled supporting frame, downwardly depending guide supports on said frame, a hoe supporting frame mounted to be shiftable up and down on said vertical guide supports, a chopping hoe mounted on said hoe supporting frame to reciprocate laterally thereon, and mechanism engaging with a wheel of the apparatus for reciprocating said hoe as the supporting frame is moved along the row.

3. In a cotton chopper, a wheeled supporting frame, downwardly depending guide supports on said frame, a hoe frame mounted to be shiftable up and down on said supporting frame, runners on the bottom of said hoe frame, extending parallel to the pole of the chopper, a chopping hoe mounted on said hoe supporting frame to reciprocate laterally thereon, mechanism engaging with a wheel of the chopper for reciprocating the said hoe as the supporting frame is moved along the row and mechanism for raising or lowering said hoe-supporting frame in the vertical guides.

4. In a cotton chopper, a wheeled supporting frame, downwardly depending guide supports on said frame, a hoe frame mounted to be shiftable up and down on said supporting frame, runners on the bottom of said hoe frame extending parallel to the pole of the chopper, a scraper at the forward end of each of said runners, a chopping hoe mounted on said hoe supporting frame to reciprocate laterally thereon, and mechanism engaging with the wheel of the chopper for reciprocating the said hoe as the supporting frame is moved along the row.

5. In a cotton chopper, a wheeled supporting frame, downwardly depending front and rear supporting bars on either side of said frame forming vertical guides, a hoe frame having forwardly and rearwardly projecting lugs adapted to engage on either side of each of said supporting bars, runners on the bottom of said frame extending parallel to the pole of the chopper, transverse guides mounted upon the hoe supporting frame, a hoe carrying bar the ends of which having sliding engagement with said guides, a hoe attached to and projecting below said bar, mechanism engaging with a wheel of the chopper for reciprocating said hoe-carrying bar along the transverse guides and mechanism for raising or lowering the hoe-supporting frame in the vertical guides.

6. In a cotton chopper, a wheeled supporting frame, downwardly depending front and rear supporting bars on either side of said frame forming vertical guides, a hoe frame having forwardly and rearwardly projecting lugs adapted to engage on either side of each of said supporting bars, runners on the bottom of said frame extending parallel to the pole of the chopper, transverse guides mounted upon the hoe supporting frame, a hoe attached to and projecting below said bar, mechanism engaging with a wheel of the chopper for reciprocating said hoe-carrying bar along the transverse guides and mechanism for raising or lowering the hoe-supporting frame in the vertical guides.

7. In a cotton chopper, oppositely placed wheels and an axle between the two, transverse beams supported on said axle forward of and above the same, said beams being placed at a distance from each other and having braces connecting them, downwardly depending supporting bars attached on either side of the front and rear beams, a hoe supporting frame movable upward and downward within the supporting bars and having forwardly and rearwardly projecting lugs engaging on either side of each supporting bar, a lever for raising and lowering the said hoe supporting frame, transverse guides on the hoe supporting frame, a hoe-carrying bar having antifriction rollers traveling on said guides, double hoes carried by said bar and projecting downward below the same, said hoes being spaced apart and adjustable nearer to or further from each other, a crank mounted on the main supporting frame connected by a link to the hoe-carrying bar, a bevel gear on said crank, and a bevel gear mounted to turn with one of the wheels of the chopper and engaging with said crank bevel gear.

8. A cotton chopper having vertical guides, a hoe-supporting frame adjustable up and down in said guides, means for raising or lowering said frame, runners on either side of the bottom of said hoe-supporting frame extending parallel to the pole of the machine whereby the hoe supporting frame may be kept a constant distance from the ground, and a hoe supported to have lateral movement on the hoe-supporting frame, and means connected to the wheels of the machine for reciprocating said hoe.

In testimony whereof I have signed my name to this specification in the presence of two subscribing witnesses at Wadesboro North Carolina this 12th day of June 1905.

WALTER LEAK ROSE.

Witnesses:
THOMAS FRANKLIN JONES,
WILLIAM THOMAS MOSS.